United States Patent [19]

Horvat et al.

[11] Patent Number: 5,416,922
[45] Date of Patent: May 23, 1995

[54] HELMET HEAD TRACKING MOUNTING DEVICE

[75] Inventors: Christina A. Horvat, Philadelphia, Pa.; Gary F. Bradley, Hendersonville; Carroll L. Rhodes, Flat Rock, both of N.C.

[73] Assignee: The United States of America as represented by the Secretary of the Navy, Washington, D.C.

[21] Appl. No.: 21,388

[22] Filed: Feb. 23, 1993

[51] Int. Cl.6 .............................. A42B 3/04
[52] U.S. Cl. ........................... 2/6.2; 2/422; 359/409
[58] Field of Search ............... 2/6.1, 6.2, 6.3, 410, 2/422, 424, 10; 359/409, 410, 411

[56] References Cited

U.S. PATENT DOCUMENTS

| | | | |
|---|---|---|---|
| 3,614,314 | 10/1971 | Rossire | 359/409 |
| 4,364,636 | 12/1982 | Ellis | 2/6.2 |
| 4,449,787 | 5/1984 | Burbo et al. | 359/410 |
| 4,468,101 | 8/1984 | Ellis | 359/409 |
| 4,592,096 | 6/1986 | Glasheen | 359/409 |
| 4,734,939 | 4/1988 | Copp | 2/422 |
| 4,907,296 | 3/1990 | Blecha | 2/422 |
| 4,987,608 | 1/1991 | Cobb | 2/422 |
| 5,176,342 | 1/1993 | Schmidt et al. | 2/6.1 |
| 5,226,181 | 7/1993 | Polednak et al. | 2/422 |

Primary Examiner—Clifford D. Crowder
Assistant Examiner—Michael A. Neas
Attorney, Agent, or Firm—James V. Tura; Susan E. Verona

[57] ABSTRACT

A unified, low-profile, lightweight and strong component mounting system for an aircrew member's helmet is disclosed. The system includes a substantially rectangular mounting bracket that carries necessary power, communications, and optical inputs to the components, mounting hardware and specially designed interface pieces for each component. The system is designed to securely and easily snap-lock onto the helmet and is positioned to stay balanced while attached to eliminate crewmember discomfort.

2 Claims, 4 Drawing Sheets

5,416,922

HELMET HEAD TRACKING MOUNTING DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

With the advancement of technology, more and more operational capabilities are presented to the crewmembers who pilot combat helicopters. Two of these capabilities, a helmet-mounted gunsight and night vision goggles, require off-sized and awkward components to hang from the front brim of the crewmember's helmet. Currently, crewmembers are required to attach these components in different and non-consistent ways to their helmet, and, when the gunsight assembly is attached, the helmet visor cannot be used. These discrepancies make it awkward for a crewmember to use both components on the same mission, or, at the very least, require the crewmember to forego use of his visor when using the gunsight.

SUMMARY OF THE INVENTION

It is therefore an object of the present invention to provide a single, common mount assembly for an aircrew member's helmet that allows use of different attached components.

It is a further object of the present invention to provide a single, common mount assembly for an aircrew member's helmet that achieves a balanced weight distribution of operational components and allows full use of the helmet's visor when the gunsight is attached.

It is a still further object of the present invention to provide a single, common mount assembly that provides better stability and reduces strain on an aircrew member's neck during flight maneuvers while operational components are attached.

It is a still further object of the present invention to provide a single, common mount assembly that allows quick and easy connect and disconnect of major operational components.

These and other advantages and features are provided in a helmet mount assembly that has a rectangularly shaped, low-profile mount assembly fastened over an aperture in the center of the helmet's brim and an attachment housing, for securely carrying major operational components, removeably affixed thereto. The mount assembly is designed to place a set of terminals for the power and other communications cables for both a gunsight reticle and a night vision goggles into side-by-side fixed positioning at a single location on the front of the brim. The attachment housing, carrying either the gunsight or the goggles, and the complement of cables and terminals for each, is designed with a cavity, slightly larger than the exterior dimensions of the mount, in its face to allow it to slip-fit over the mount. A spring-loaded plunger and shelf provide the necessary latching and releasing mechanism to allow the housing to snap-lock over the mount to align the component directly in front of the crewmember's eyes.

The novel features which are believed to be characteristics of the invention, both as to its organization and methods of operation, together with further objects and advantages thereof, will be better understood from the following descriptions in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 4 shows an exploded and enlarged view of the mount assembly as attached to the brim of the helmet;

DETAILED DESCRIPTION OF THE PREFERRED EMBODIMENT

Figure 1:
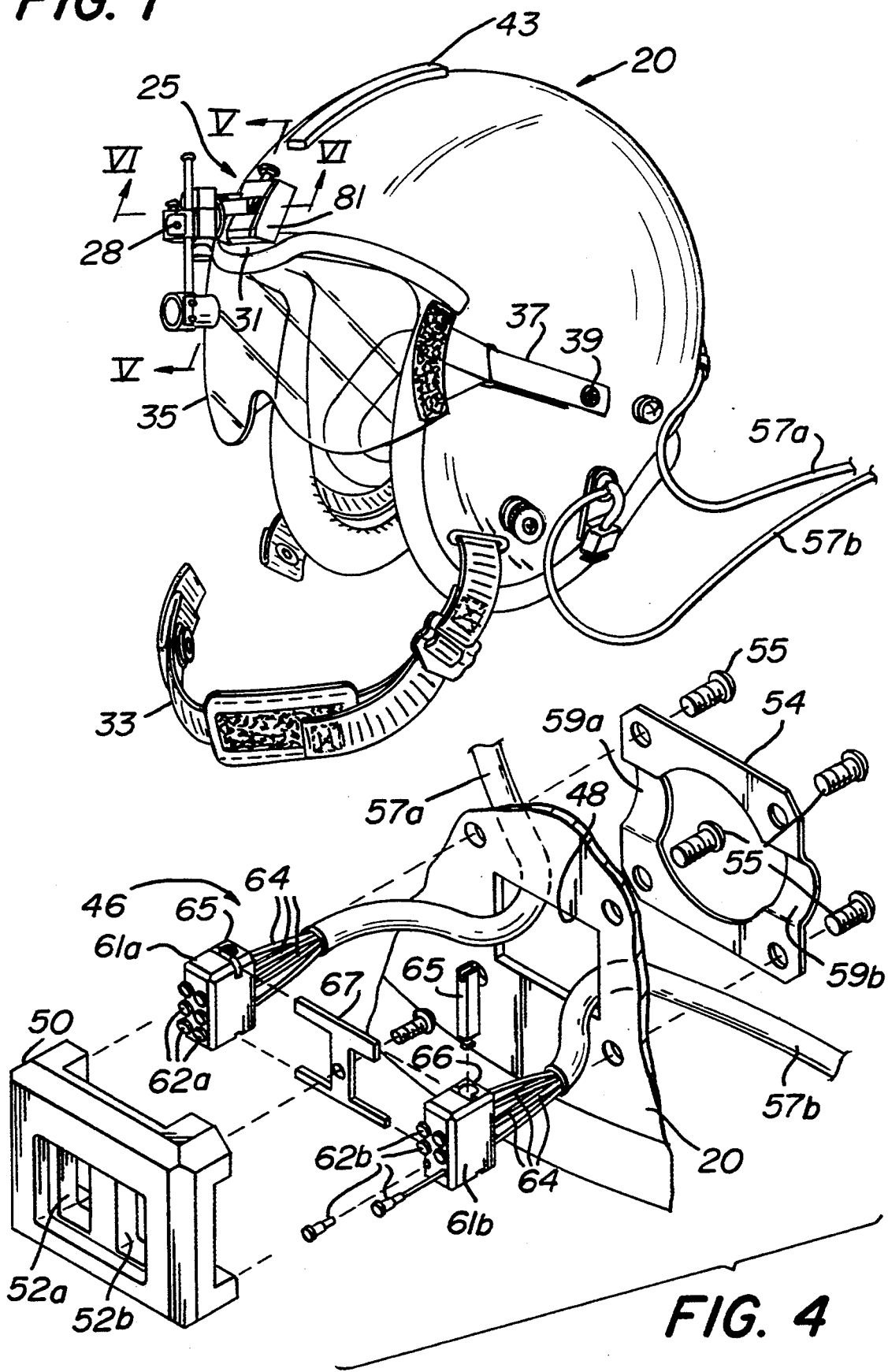
FIG. 1 shows a perspective view of an aircrew member's helmet with the instant invention attached at the front, center area of the brim portion.

Referring now to the drawings, wherein like reference characteristics designate like or corresponding parts throughout the several views, there is illustrated in FIG. 1, a perspective view of an aircrew member's helmet 20 showing one version of the instant invention, the helmet head tracking mounting device 25, attached to the front-center portion of the brim 31 of the helmet. As known in the industry, an aircrew member's helmet 20 consists of a rigid, shell-like material fashioned to be worn over a crewmember's head and carries, inter alia, a chinstrap 33 and a visor 35. Visor 35 is attached by means of straps 37 that rotate around fasteners 39 (only the left side strap 37 and fastener 39 are shown in FIG. 1) to allow the visor to be placed into the position shown from an out-of-the-way position adjacent visor guide 43 at the top of helmet 20. Crewmember comfort, both in how the helmet fits over the head and how trouble-free it is to use the visor, is very important. This is especially true when the crewmember has sensitive components attached to the helmet or when the flight regime requires focused concentration. As will be explained, the instant invention facilitates the use of visor 35 and the attachment and use of visual components while the crewmember is performing very important tasks.

Mounting device 25 has been designed to provide a two-piece arrangement, comprised of a common helmet mount assembly attached to helmet 20 and a component sub-assembly that is removably affixed thereto, that will ensure that whenever a component, such as a gunsight reticle or a night vision goggles, is snapped into place, it will remain in its location relative to the crewmember's eyes and cannot be easily jarred or moved. Also, the low profile of the helmet mount assembly allows the crewmember to easily pass visor 35 back and forth from a storage position to an in-use position.

Figure 2:
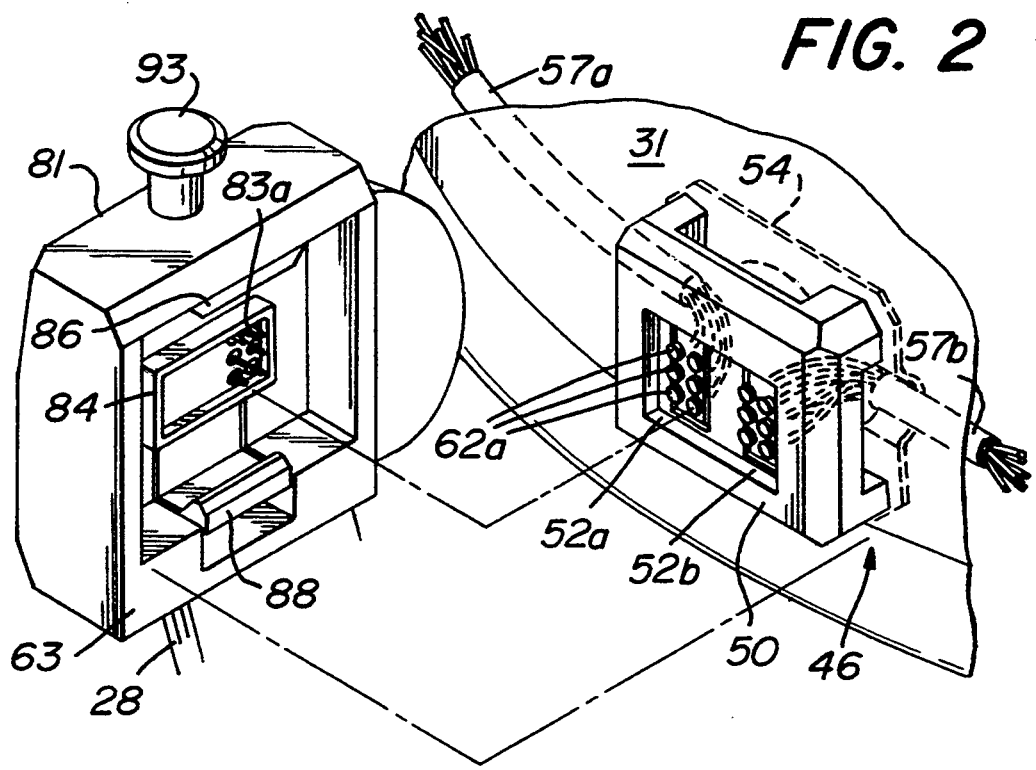
FIG. 2 shows an exploded and enlarged view of the mount assembly of FIG. 1 showing the inside of the sub-assembly portion ready to attach a gunsight reticle component.
Figure 3:
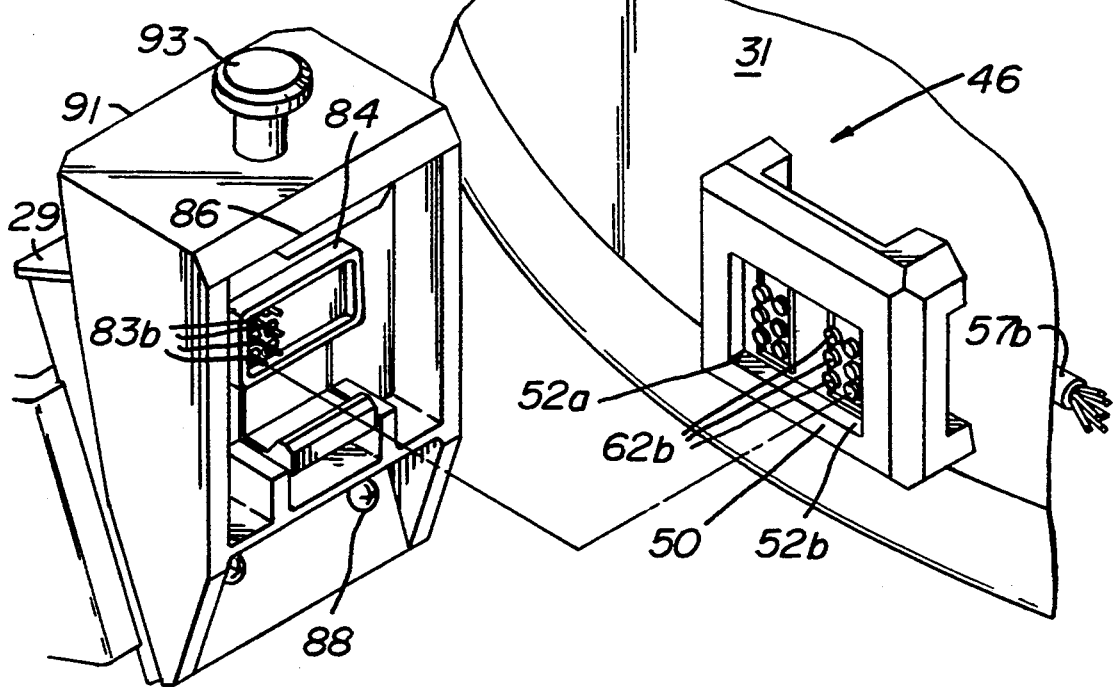
FIG. 3 shows an exploded and enlarged view of the mount assembly of FIG. 1 showing the inside of the sub-assembly portion ready to attach a night vision goggles component.

Referring now to FIGS. 2 and 3, there is shown, in FIG. 2, an exploded and enlarged view of mounting device 25 where common helmet mount assembly 46 is ready to receive component sub-assembly 81, and in FIG. 3, an exploded and enlarged view of mounting device 25 where mount assembly 46 is ready to receive component sub-assembly 91. One of the differences between sub-assembly 81 and sub-assembly 91 is the component attached. FIGS. 1, 2, 5 and 6 show a gunsight reticle assembly 28 attached to the outward-facing surface of sub-assembly 81 and FIGS. 3 and 7 show a night vision goggles assembly 29 attached to the outward-facing surface of sub-assembly 91. As both of these components are well-known in the art, neither will be further described.

FIG. 4 shows an exploded and enlarged view of common mount assembly 46 as it is permanently affixed to a predetermined location on the center of the brim of helmet 20. Once the location on the helmet brim for assembly 46 has been determined, a rectangular aperture 48 is made therein and a rectangular terminal framework 50, having a plurality of throughports 52a,52b therein, is attached over the cut-out section. Framework 50 can be made from high-impact plastic, as is known in the industry, as is approximately 1-7/16 inches wide by 1-5/16 inch high by 7/16 inch deep. Throughports 52a,52b are each approximately ¼ inch wide by ½ inch high apertures. As shown, a stiffening and reinforcement plate 54, made from standard aluminum alloy plate material is used to secure corner attachment screws 55 through helmet 20 and into framework 50 and to secure cables 57a,57b via channels 59a,59b.

The purpose of framework 50 is to securely position the terminal blocks 61a and 61b. Each block 61 is a hexahedron made from high impact plastic of slightly smaller outside dimensions as the inside dimensions of throughports 52a,52b to be sized to fit into the throughports. Each block 61 contains a plurality of press-fitted solder terminals 62 connected to wires 64 and has a cam 65 inserted into an access slot 66 to act as a strain relief on the wires. Finally, an H-shaped retainer bracket 67 is used to secure each block 61 to framework 50.

Figure 5:
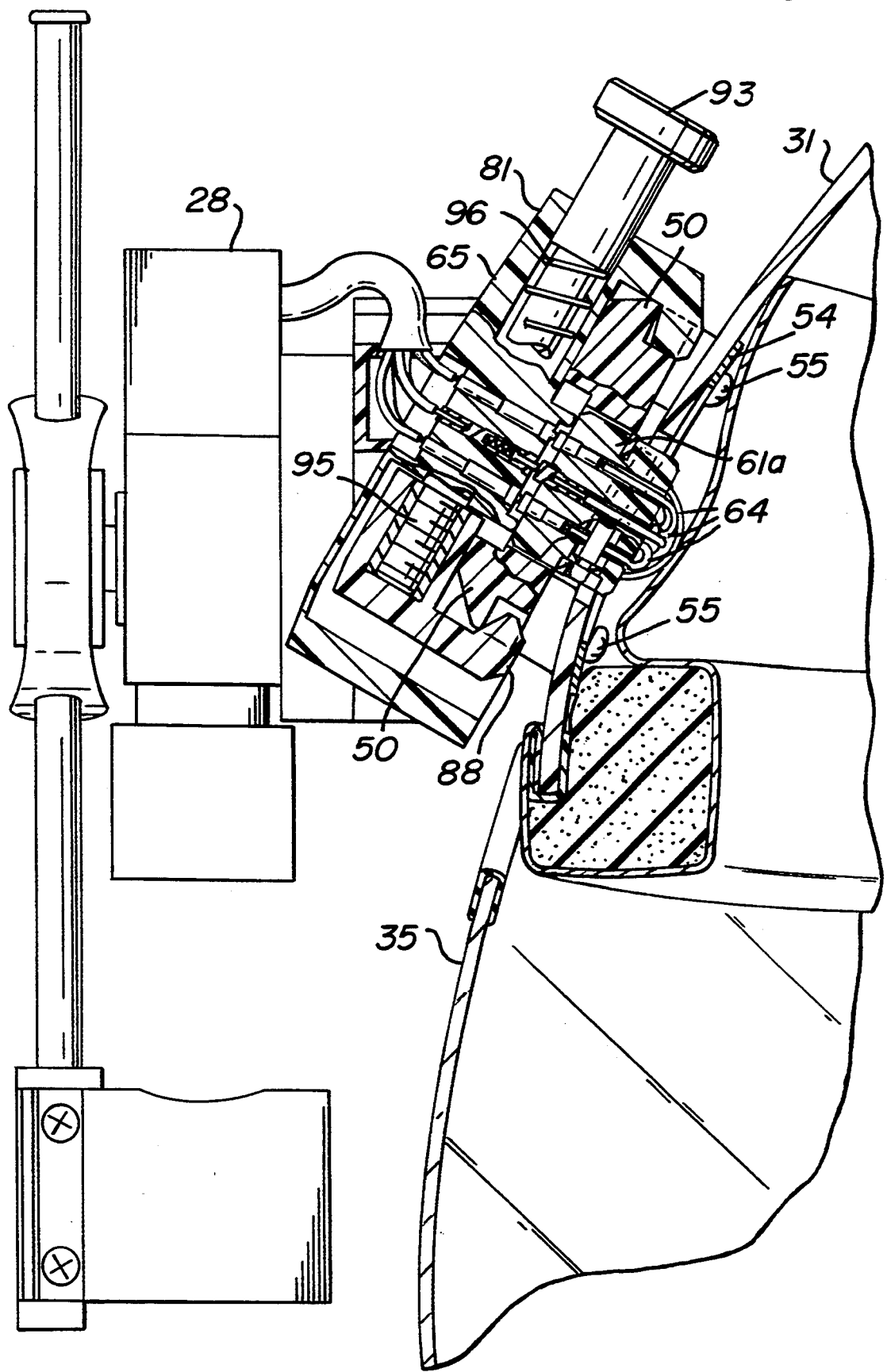
FIG. 5 shows a cross-sectional view of the mount assembly taken along lines V—V of FIG. 1.
Figure 6:
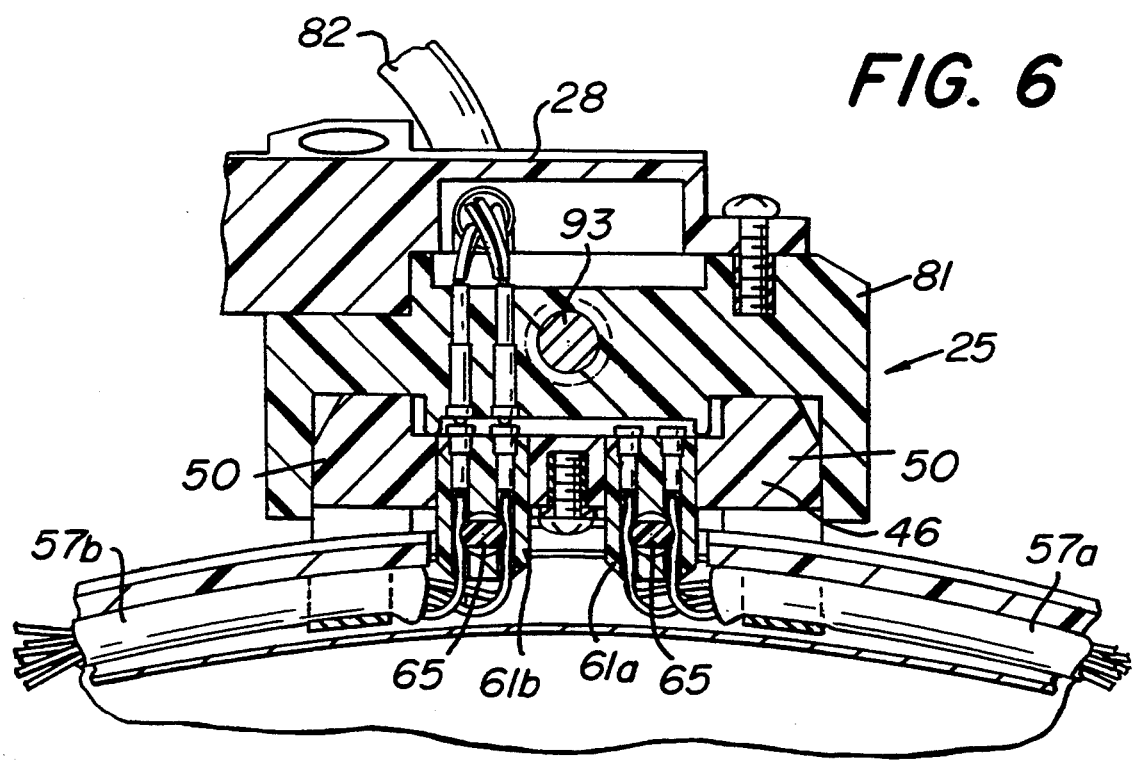
FIG. 6 shows a cross-sectional view of the mount assembly shown in FIG. 2 as taken along lines VI—VI of FIG. 1.
Figure 7:
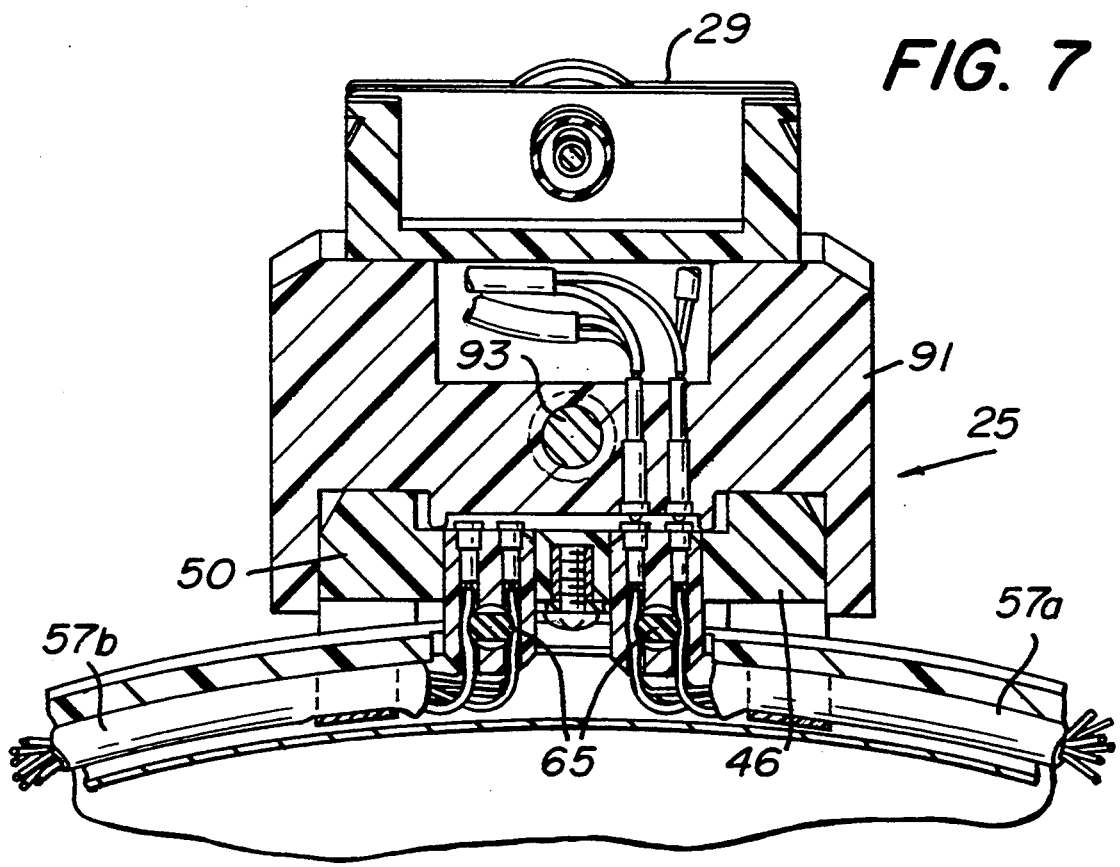
FIG. 7 shows a cross-sectional view of the mount assembly, similar to the view of FIG. 6, except that the night vision goggles is attached instead of the gunsight reticle assembly.

Referring to FIGS. 2, 5 and 6, sub-assembly 81 can be seen more clearly. Part 81 is constructed in the shape of a hexahedron out of high impact plastic with the front, helmet-facing side 63 having a cavity therein, and the rear, outwardly-facing side 65 (as seen on FIG. 5) being configured to attach the gunsight accessory 28. As earlier explained, the sizes of the dimensions of the cavity are such that part 81 makes a "slip-fit" as the term is known in the industry, over framework 50 The purpose of this slip-fit is to ensure that corresponding spring-loaded contacts 83a interface, with the proper terminals 62a carried by block 61 to complete the electrical circuit. As seen, contacts 83 are maintained in a set pattern inside of an alignment frame 84. Frame 84 is sized to fit precisely around the inside perimeter of through-ports 52a,52b, so that the corresponding contacts are aligned. As seen in FIG. 3, the design and construction of sub-assembly 91 is very similar to that of sub-assembly 81 and therefore will not be described separately. The proper functioning of either the gunsight component 28 or the night vision goggles component 29 depends upon this alignment and connection.

Either sub-assembly 81 or 91 stays securely attached, in the correct position to match contacts 83 to terminals 62, and can be easily removed. The alignment is accomplished by tilting the sub-assembly back at its top portion to allow a tab 86 to fit into the open slot between the top of framework 50 and brim 31. Once tab 86 is in place, the sub-assembly is rotated downward to make positive contact with the rest of framework 50. A spring-loaded shelf 88, sized appropriately to fit into the open slot between the bottom of framework 50 and brim 31, is positioned to be forced into the open slot as the sub-assembly is rotated toward a snug fit. Shelf 88 is controlled and moved by a spring-loaded plunger 93. As seen more clearly in FIG. 5, a cross-sectional view of device 25 taken along lines V—V of FIG. 1, plunger 93 and shelf 88 are joined together, as by twisting shank 95 into a journalled hole in shelf 88. Prior to such operation, a compression spring 96 is fitted around shank 95 and captured in its extended position. To remove either sub-assembly 81 or 91, the crewmember pushes down on plunger 93, thereby removing shelf 88 from behind framework 50, and rotates the bottom out and away from framework 50. Once it is clear, the whole sub-assembly can be lifted free.

As seen in FIGS. 6 and 7, cross-sectional views of device 25 taken along lines VI—VI of FIG. 1, different shapes and sizes of the specific component being used will provide slightly different amounts of material to attach to mount assembly 46. As shown in FIG. 6, sub-assembly 81 is designed to attach to a gunsight reticle 28 and has power cord 82 extending therefrom. As shown in FIG. 7, sub-assembly 91 has been constructed to have a night vision goggles 29 attached thereto and therefore needs a larger base (see also FIG. 3) for the goggles to attach to.

Finally, while the helmet head tracking mounting device has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

What we claim is:

1. A component mounting device for securely and removably attaching aircrew member optical components to the crewmember's helmet comprising:

a common helmet mount assembly, and including at least one terminal block with at least one terminal removably attached thereto and with at least one wire connected thereto;

attachment means securely and removably affixed onto said mount assembly to optionally carry an optical component; and a latch means including a slideable plunger extending from the topside to the bottomside, spring means concentrically engaging said plunger and shelf means adjacent said plunger to make a snap-lock fit with said mount assembly.

2. A device for securely and removably mounting components to hang from the front brim of a helmet, comprising:

a substantially rectangular mount assembly having a pair of through-ports therein;

communication terminals attached in said through-ports; and a substantially hexahedronal attachment housing having a cavity in the front face thereof, the cavity being sized to slip-fit over said mount assembly, said housing having attachment brackets on the oppositely-disposed rear face for optical components and being removably secured by a spring-loaded latch.

* * * * *